US006091285A

United States Patent [19]

Fujiwara

[11] Patent Number: 6,091,285

[45] Date of Patent: Jul. 18, 2000

[54] CONSTANT VOLTAGE OUTPUT DEVICE

[75] Inventor: Masayu Fujiwara, Kyoto, Japan

[73] Assignee: Rohm Co., Ltd., Kyoto, Japan

[21] Appl. No.: 08/988,468

[22] Filed: Dec. 10, 1997

[30] Foreign Application Priority Data

Dec. 11, 1996 [JP] Japan ................................ H8-331021

[51] Int. Cl.[7] ........................................................ G06F 3/02

[52] U.S. Cl. ............................................ 327/539; 327/546

[58] Field of Search .................................... 323/313, 314; 327/538, 539, 540, 541, 543, 545, 546, 143

[56] References Cited

U.S. PATENT DOCUMENTS

| | | | |
|---|---|---|---|
| 4,287,439 | 9/1981 | Leuschner | 307/310 |
| 4,380,706 | 4/1983 | Wrathall | 307/297 |
| 4,795,961 | 1/1989 | Neidirf | 323/314 |
| 4,857,823 | 8/1989 | Bitting | 323/314 |
| 5,061,862 | 10/1991 | Tamagawa | 307/296.1 |
| 5,610,506 | 3/1997 | McIntyre | 323/313 |
| 5,629,611 | 5/1997 | McIntyre | 323/313 |
| 5,867,013 | 2/1999 | Yu | 323/314 |
| 5,867,056 | 2/1999 | Zoellick | 327/541 |

*Primary Examiner*—Jeffrey Zweizig
*Attorney, Agent, or Firm*—Arent, Fox, Kintner, Plotkin & Kahn

[57] ABSTRACT

A constant voltage output device has a field-effect transistor and a comparator. Between the output electrode of the field-effect transistor and ground, a first resistor, a second resistor, and a first diode are connected in series. Moreover, between the output electrode of the field-effect transistor and ground, a third resistor and a second diode are connected in series. The comparator compares the voltage at the node between the first and second resistors with the voltage at the node between the third resistor and the second diode, and feeds the comparison result to the gate of the field-effect transistor. At an output terminal appears a desired voltage that is determined by the ratio between the current capacities of the first and second diodes and by the ratio between the resistances of the first and second resistors.

11 Claims, 4 Drawing Sheets

CONSTANT VOLTAGE OUTPUT DEVICE

BACKGROUND OF THE INVENTION

1. Field of the Invention

The present invention relates to a constant voltage circuit, and in particular to a constant voltage output device employing field-effect transistors.

2. Description of the Prior Art

FIG. 4 shows a conventional constant voltage output device employing bipolar transistors. The transistors Q17 and Q18 form a current mirror circuit having a resistor R6 connected to the emitter of the transistor Q18. Let the base-emitter voltage of the transistor Q17 be $VF_{17}$ and that of the transistor Q18 be $VF_{18}$, and assume that the capacity of the transistor Q18 is 10 times that of the transistor Q17. The resistance of the resistor R6 is so determined that, in the steady state, the current $I_6$ flowing through the transistor Q17 and the current $I_7$ flowing through the transistor Q18 are equal. Then, the voltage across the resistor R6 is expressed as $$\begin{aligned} VF_{17} - VF_{18} &= V_T \ln\frac{I_6}{I_S} - V_T \ln\frac{I_7/10}{I_S} \\ &= V_T\left(\ln\frac{I_6}{I_S} - \ln\frac{I_7/10}{I_S}\right) \\ &= V_T \ln(10) \end{aligned}$$

where $V_T$=kT/q (with k representing Boltzmann's constant, T representing absolute temperature, and q representing the charge of an electron), and $I_S$ represents the saturation current of the transistor Q17. Hence, the current $I_7'$ that flows through the resistor R6 can be expressed approximately as $$I_7' = \frac{V_T \ln(10)}{R6}.$$

If it is assumed that the capacities of the transistors Q16 and Q19 are equal, the current $I_8$ flowing through the resistor R7 and the diode D5 is equal to the current $I_7$. Let the forward voltage of the diode D5 be $VF_5$. Then, the output voltage Vout is expressed as $$Vout = VF_5 + \frac{R7}{R6} V_T \ln(10).$$

The output voltage Vout depends on the ratio between the resistances of the resistors R6 and R7 and on the ratio between the capacities of the transistors Q17 and Q18. Note that, when the circuit is started up, the transistors Q17 and Q18 are turned on by the current supplied from a starting circuit 16.

However, quite inconveniently, it has been impossible to construct a constant voltage output device that operates in the same way as the above-described conventional constant voltage output device by the use of field-effect transistors instead of bipolar transistors. In digital IC (integrated circuit) devices composed of field-effect transistors, using bipolar transistors solely to compose their constant voltage circuit sections leads to extra production cost.

SUMMARY OF THE INVENTION

An object of the present invention is to provide a constant voltage output device composed of field-effect transistors.

To achieve the above object, according to one aspect of the present invention, a constant voltage output device is provided with: a field-effect transistor; a first serial circuit composed of a first resistor, a second resistor, and a first diode connected in series between an output electrode of the field-effect transistor and a reference voltage point (for example, a ground voltage point); a second serial circuit composed of a third resistor and a second diode connected in series between the output electrode of the field-effect transistor and the reference voltage point; a comparator whose first input terminal is connected to a node between the first resistor and the second resistor and whose second input terminal is connected to a node between the third resistor and the second diode; means for feeding an output of the comparator back to a gate of the field-effect transistor; and an output terminal connected to the output electrode of the field-effect transistor.

According to another aspect of the present invention, a constant voltage output device is provided with: a field-effect transistor; a first serial circuit composed of a first resistor, a second resistor and a first diode connected in series between an output electrode of the field-effect transistor and a reference voltage point; a second serial circuit composed of a third resistor and a second diode connected in series between the output electrode of the field-effect transistor and the reference voltage point; a comparator whose first input terminal is connected to a node between the first resistor and the second resistor and whose second input terminal is connected to a node between the third resistor and the second diode; a feed line for feeding an output of the comparator back to a gate of the field-effect transistor; pre-driver means provided in the feed line for turning on the field-effect transistor when the power source voltage is lower than a predetermined voltage; and an output terminal connected to the output electrode of the field-effect transistor.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
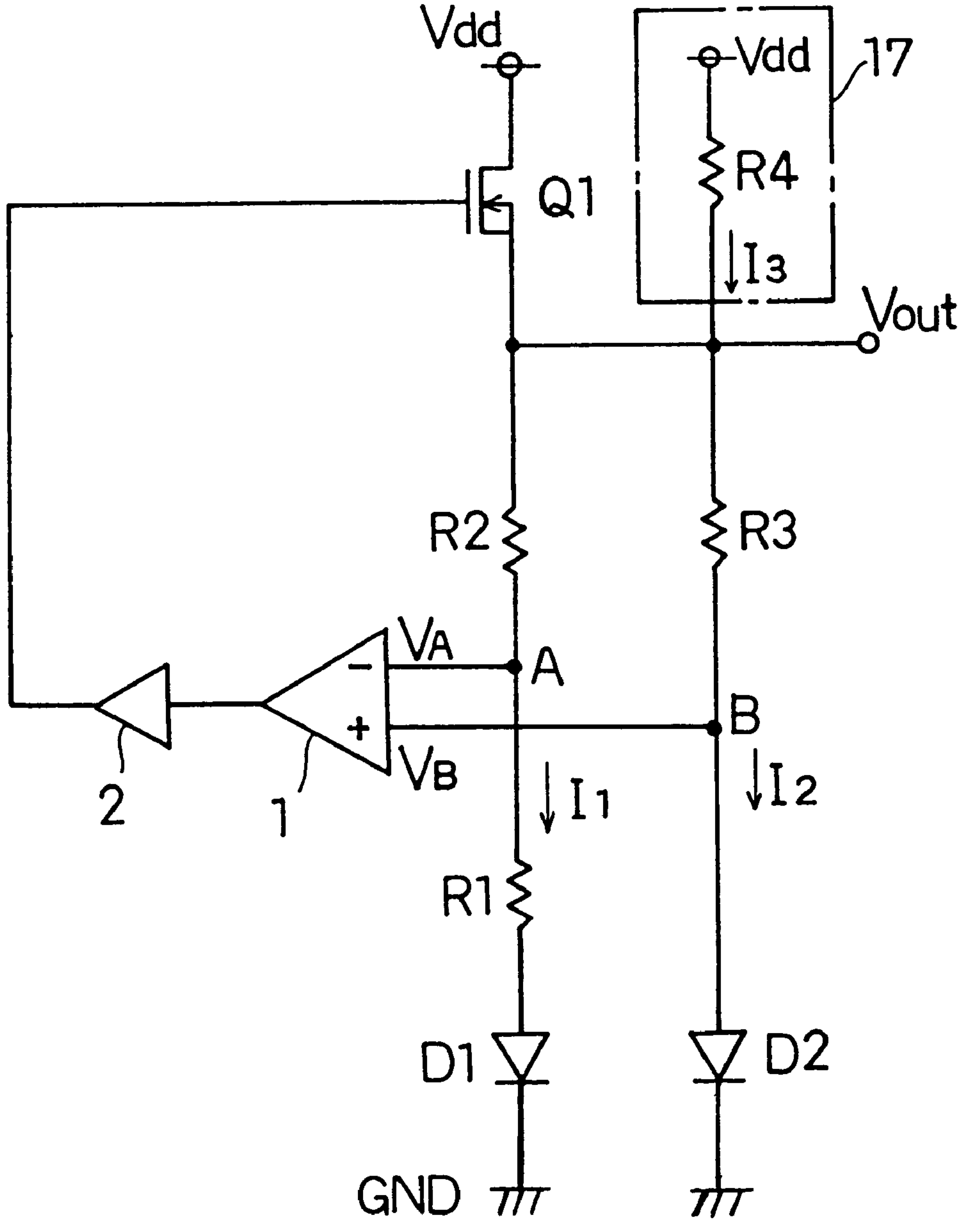
FIG. 1 is a circuit diagram of the constant voltage output device of a first embodiment of the invention.

A first embodiment of the present invention will be described with reference to FIG. 1. FIG. 1 shows a circuit diagram of a constant voltage output device embodying the invention. This circuit is so constructed that its output voltage Vout is kept constant by feedback-controlling an n-channel MOS (metal-oxide semiconductor) field-effect transistor Q1. The drain of the transistor Q1 is connected to a source of the voltage Vdd. The source of the transistor Q1 is, on the one hand, connected to a serial circuit composed of a resistor R2, a resistor R1, and a diode D1 connected in series in this order from the transistor Q1 side to the ground GND, and, on the other hand, connected to another serial circuit, provided parallel to the first one, composed of a resistor R3 and a diode D2 connected in series in this order from the transistor Q1 side. The diodes D1 and D2 may be formed as diode-connected MOS transistors.

The node A between the resistors R2 and R1 and the node B between the resistor R3 and the diode D2 are connected to the inverting and non-inverting input terminals (–) and (+), respectively, of a comparator 1. The resistors R2 and R3 have equal resistances. The resistance of the resistor R1 is so determined that, while the constant voltage circuit is outputting a specified voltage Vout, the currents $I_1$ and $I_2$ are kept equal. While the constant voltage circuit is outputting the specified voltage Vout, the voltage $V_A$ at the inverting input terminal (–) of the comparator 1 and the voltage $V_B$ at its non-inverting terminal (+) are equal. The comparator 1 compares these voltages $V_A$ and $V_B$, and feeds the result through a pre-driver circuit 2 to the gate of the transistor Q1. thereby achieving feedback control.

Let the forward voltage of the diode D1 be $VF_1$ and that of the diode D2 be $VF_2$.

Then, if it is assumed that the capacity (current capacity) of the diode D1 is 10 times that of the diode D2, the voltage applied across the resistor R1 is expressed as $$VF_2 - VF_1 = V_T \ln\frac{I_2}{I_S} - V_T \ln\frac{I_1/10}{I_S}.$$

Since $I_1 = I_2$, $$VF_2 - VF_1 = V_T ln(10).$$

Here, $V_T$=kT/q (with k representing Boltzmann's constant, T representing absolute temperature, and q representing the charge of an electron), and $I_s$ represents the saturation current of the diodes D1 and D2.

Hence, the current $I_1$ flowing through the resistor R1 is expressed as $$I_1 = \frac{V_T \ln(10)}{R1}.$$

Therefore, the output voltage Vout is expressed as $$Vout = VF_2 + \frac{R2}{R1} V_T \ln(10).$$

As seen from above, the voltage Vout depends on the ratio between the capacities of the diodes D1 and D2 and on the ratio between the resistances of the resistors R1 and R2. The absolute values of the capacities of the diodes D1 and D2 can be determined appropriately in accordance with what voltage is desired as the output voltage Vout.

When the voltage Vout drops below the specified voltage, the currents $I_1$ and $I_2$ decrease. This causes the voltage $V_4$ to become lower than the voltage $V_8$ because, whereas the forward voltages $VF_1$ and $VF_2$ vary only slightly with the variation in the currents $I_1$ and $I_2$, the voltage drop across the resistor R1 is proportional to the current It flowing therethrough. As a result, the comparator 1 feeds the pre-driver circuit 2 with a result of comparison that requests an increase in the current flowing through the transistor Q1. In this way, the voltage Vout is kept at the specified voltage. When the voltage Vout rises above the specified voltage, the feedback control keeps the voltage Vout at the specified voltage by decreasing the current flowing through the transistor Q1.

The starting circuit 17 consists of a resistor R4. Without the starting circuit 17. the transistor Q1 may remain in the off state at the start-up when the power source voltage Vdd is first supplied, and thus make the voltage Vout indefinite.

To prevent this, at the start-up, a starting current $I_3$ is made to flow through the resistor R4 so that an offset is provided that causes the voltage $V_A$ to be lower than the voltage $V_B$ when the transistor Q1 is in the off state. The comparator 1, comparing the voltages $V_A$ and $V_B$ including such an offset, turns on the transistor Q1. Thus, the voltage Vout is kept at the specified voltage. However, an excessively high starting current $I_3$ causes the voltage $V_A$ to remain higher than the voltage $V_B$ beyond the effect of feedback control. To avoid this, the starting current $I_3$ needs to satisfy the limitation $I_3 < 2 \times I_1'$ (where $I_1'$ represents a value of the current $I_1$ in the steady state).

This helps stabilize the operation of the constant voltage circuit in non-steady states such as at the start-up or after a momentary power failure.

The constant voltage circuit of this embodiment finds applications in integrated circuits such as digital-to-analog converters that require a constant voltage circuit as a reference voltage source or reset ICs that output a set or reset signal according to whether it detects a particular voltage or not.

In FIG. 1, when, instead of the n-channel MOS transistor, a p-channel MOS transistor is used as Q1, its source is connected to Vdd and its drain is connected to the two serial circuits including the resistor R2 and others, with $V_A$ and $V_B$ applied to the non-inverting and inverting input terminals (+) and (–), respectively, of the comparator 1.

Figure 2:
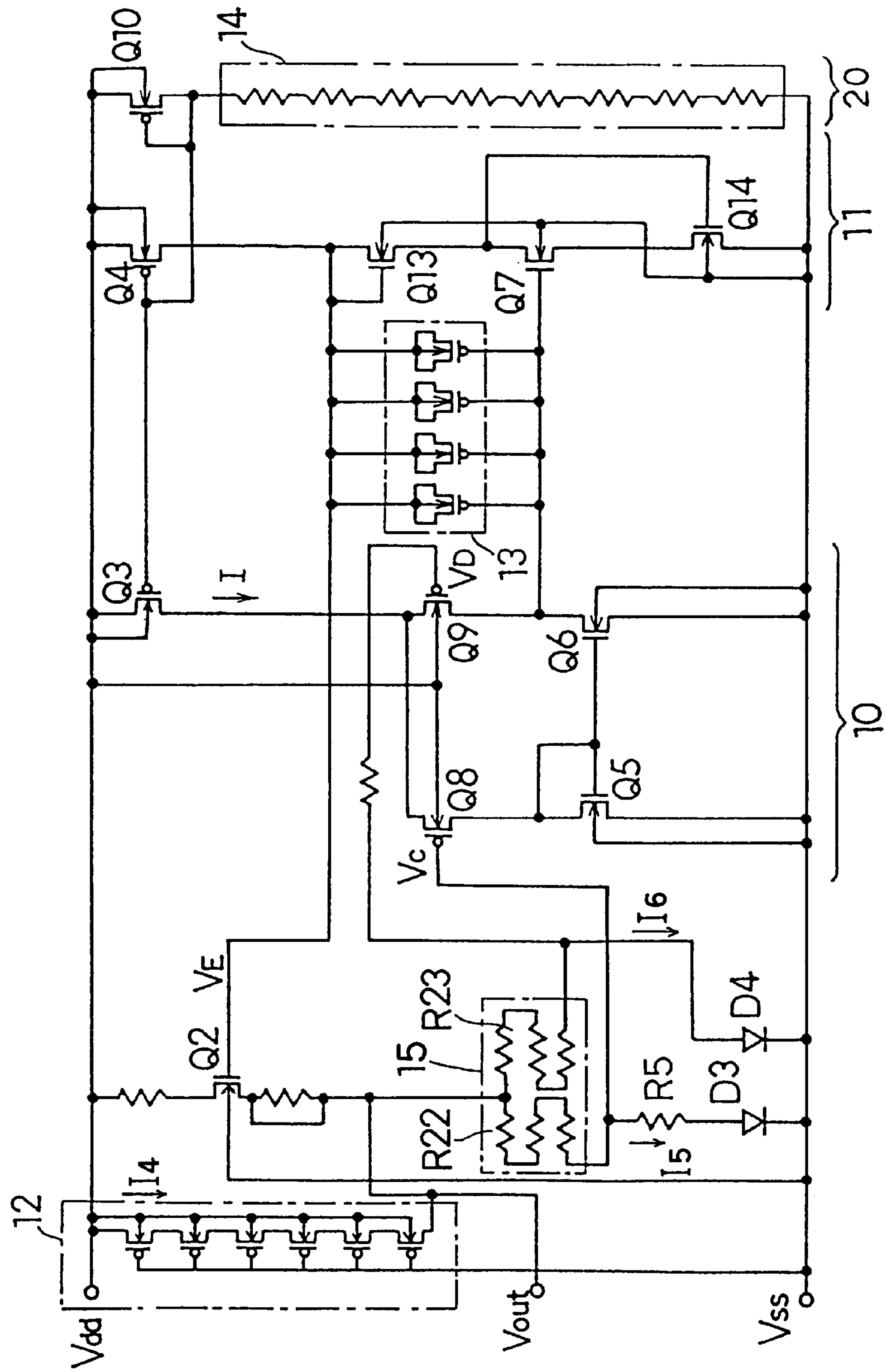
FIG. 2 is a circuit diagram of the constant voltage output device of a second embodiment of the invention.

A second embodiment of the present invention will be described with reference to FIG. 2. FIG. 2 shows a circuit diagram of another constant voltage circuit embodying the invention. This circuit is composed solely of MOS transistors, and is constituted in the same manner as the circuit of the first embodiment (FIG. 1) except in the respects described hereafter. The constant voltage circuit, when supplied with a power source voltage Vdd and a ground level Vss, outputs a specified voltage Vout through feedback control of an n-channel MOS transistor Q2.

The starting circuit 12 is composed of, for example, a plurality of MOS transistors that are connected in series to serve as a resistor having a resistance of several hundred kilohms. Exploiting the on-state resistance of transistors in this way requires a smaller area than using a resistor in the starting circuit 12. The starting circuit 12 provides a flow of starting current $I_4$. The source of the MOS transistor Q2 is connected to a resistive portion 15, which includes resistors R22 and R23 that correspond to the resistors R2 and R3 in FIG. 1.

The current that flows through the resistive portion 15 is divided into two currents, of which one $I_5$ is directed through a resistor R5 to a diode D3 and the other $I_6$ is directed to a diode D4. The diodes D3 and D4 are formed as diode-connected MOS transistors.

The comparator 10 is a differential amplifier that consists essentially of p-channel MOS transistors Q8 and Q9. The comparator 10 compares the voltage $V_C$ at the node between the resistive portion 15 and the resistor R5 with the voltage $V_D$ at the node between the resistive portion 15 and the diode D4. The comparator 10 is driven by a p-channel MOS transistor Q3 provided on the power source voltage Vdd side and by a current mirror circuit composed of n-channel MOS transistors Q5 and Q6 provided on the ground level Vss side.

The transistor Q9, from its drain, feeds a signal to the pre-driver circuit 11. To prevent oscillation that may be caused by feedback control, a capacitive portion 13 is provided. Instead of the capacitive portion 13, which is composed of a plurality of capacitors made of MOS in the embodiment under discussion, it is possible to use a single capacitor.

In response to the signal fed from the comparator 10, the pre-driver circuit 11, using mainly n-channel MOS transistors Q7 and Q14. controls the transistor Q2. The n-channel MOS transistor Q13 selves as a diode. The pre-driver circuit 11 keeps the voltage Vout at the specified voltage through feedback control of the transistor Q2. The p-channel MOS transistors Q3 and Q4 are driven by a p-channel MOS transistor Q10, whose drain is connected through a resistive portion 14 to the ground level Vss and whose source is connected to the power voltage Vdd. The transistors Q3 and Q4 serve as a current source.

Without the starting circuit 12, feedback control is performed improperly when the transistor Q2 is not in the on state at the start-up. To avoid this, at the start-up, the starting circuit 12 produces a starting current $I_4$, which causes currents $I_5$ and $I_6$ to flow through the resistive portion 15 and then through the diodes D3 and D4, respectively. This causes voltages $V_C$ and $V_D$ to be applied to the gates of the transistors Q8 and Q9, respectively, that constitute the comparator 10, and thus, based on the comparison of these voltages, the constant voltage circuit starts operating properly.

If it is assumed that the capacity of the diode D3 is ten times that of the diode D4, the current $I_5$ is expressed, as in the first embodiment, as $$I_5 = \frac{V_T \ln(10)}{R5}.$$

The current $I_4$ produced by the starting circuit 12 needs to satisfy, as in the first embodiment, the condition $$I_4 < 2 \times I_5.$$

Figure 3:
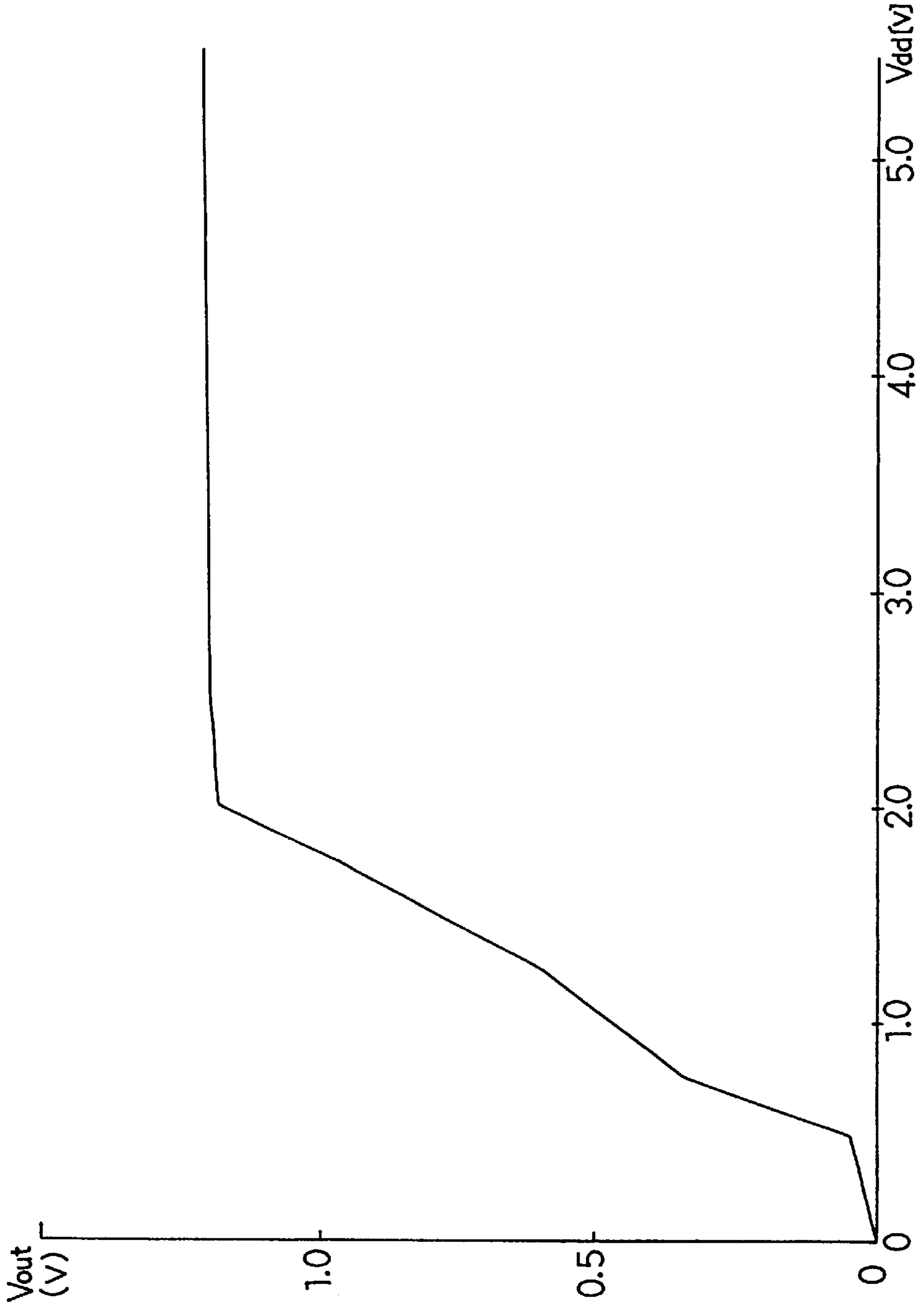
FIG. 3 is a characteristic curve of the output voltage of the constant voltage output device of the invention at its start-up.
Figure 4:
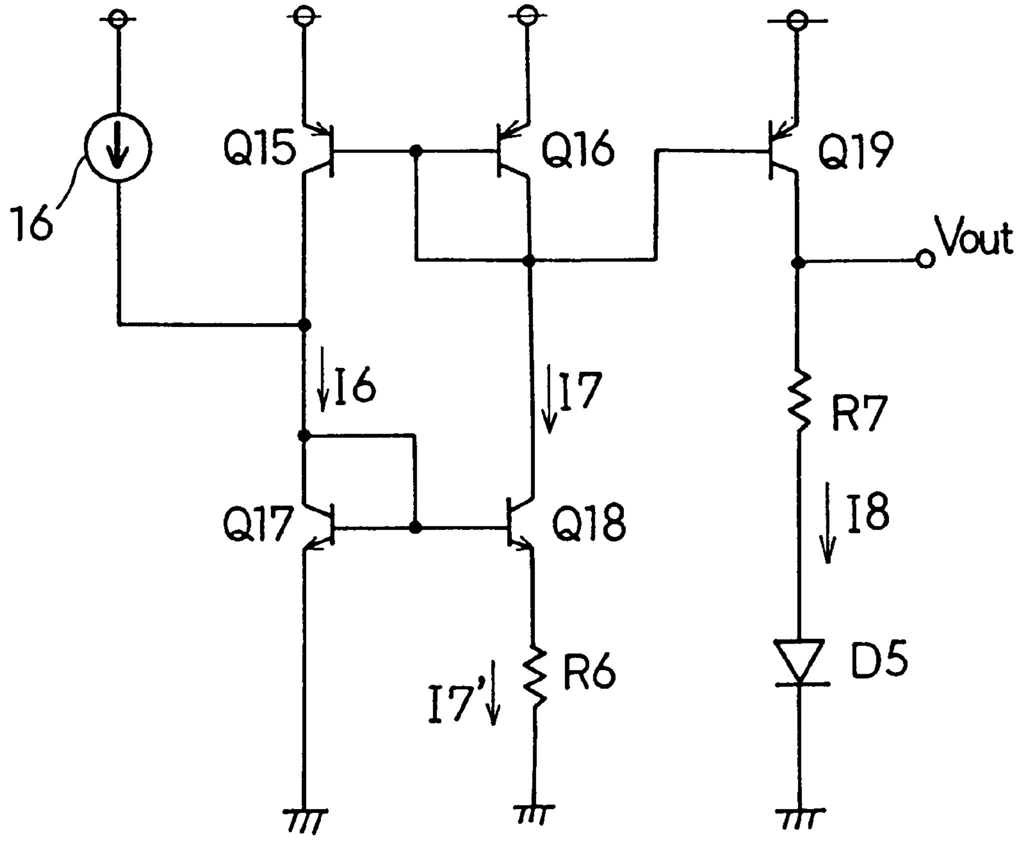
FIG.4 PRIOR ART
FIG. 4 is a circuit diagram of a conventional constant voltage output device.

FIG. 3 shows the start-up characteristic of the output voltage Vout; specifically, it shows the relation between the power source voltage Vdd and the output voltage Vout as observed when the specified voltage Vout is 1.2 volts. As shown in this figure, as the power source voltage Vdd rises from 0 to about 2 volts, the output voltage Vout rises linearly; when the power source voltage Vdd rises further, the output voltage Vout settles to the specified voltage.

In this way, the constant voltage circuit of this embodiment operates stably and yields the specified voltage even when the power source voltage Vdd is as low as 2 volts. Note that the starting circuit 12 may be composed of a single MOS transistor or resistor element; moreover, the resistor 14 that constitutes a bias circuit 20 may be realized by the use of the on-state resistance of a MOS transistor, or the entire bias circuit 20 may be constituted in any other manner.

Without the starting circuit 12, the constant voltage circuit operates unstably, because, while the power source voltage Vdd is substantially low, feedback control is not performed unless the transistor Q2 is turned on by noise or other. In such a case, the output voltage Vout remains indefinite while the power source voltage Vdd is between 0 and 3 volts, for example, and suddenly settles to the specified voltage when the power source voltage Vdd reaches 3 volts.

A third embodiment of the present invention will be described with reference to FIG. 2. The constant voltage circuit of this embodiment is constituted in the same manner as that of the second embodiment, except that, for the simplification of the circuit, the starting circuit 12 is omitted and the pre-driver circuit 11 is configured differently in terms of the capacities of the transistors used therein. In this constitution, the voltages $V_C$ and $V_D$ tend to be equal when the transistor Q2 is not in the on state, such as when the circuit has just been started up. This means that, when a current I flows through the transistor Q3, a current I/2 flows through each of the transistors Q5 and Q6.

Let the capacities of the transistors Q3, Q4, Q6, and Q7 be Q3', Q4', Q6', and Q7', respectively. Then, considering that the current flowing through the transistor Q3 is twice the current flowing through each of the transistors Q6 and Q7, the capacities of the four transistors Q3, Q4, Q6, and Q7 are so determined as to satisfy the condition $$\frac{2 \times Q3'}{Q6'} < \frac{Q4'}{Q7'}.$$

By increasing the capacity of the transistor Q4, it is possible to increase the gate voltage $V_E$ of the transistor Q2 at the start-up. This makes it possible to turn on the transistor Q2 at the start-up, and thus facilitates the transition to proper feedback control. In this way, even without the starting circuit 12, the constant voltage circuit can be made to operate stably at a relatively low power source voltage. In other respects, this constant voltage circuit is constituted and operates just as that of the second embodiment, and therefore overlapping explanations will not be repeated.

What is claimed is:

1. A constant voltage output device comprising:

a field-effect transistor;

a first serial circuit composed of a first resistor, a second resistor, and a first diode connected in series between an output electrode of the field-effect transistor and a reference voltage point;

a second serial circuit composed of a third resistor and a second diode connected in series between the output electrode of the field-effect transistor and the reference voltage point;

a comparator whose first input terminal is connected to a node between the first resistor and the second resistor and whose second input terminal is connected to a node between the third resistor and the second diode;

means for feeding an output of the comparator back to a gate of the field-effect transistor;

an output terminal connected to the output electrode of the field-effect transistor; and a starting circuit for supplying the first and second serial circuits with starting currents, said starting circuit is connected to the output electrode of the field-effect transistor, wherein $I_3 < 2 \times I_1'$, where $I_3$ represents the starting current and $I_1'$ represents a value of current flowing through the first resistor in a steady state.

2. A constant voltage output device as claimed in claim 1, wherein the constant voltage output device outputs at its output terminal a desired voltage that is determined by a ratio between current capacities of the first and second diodes and by a ratio between resistances of the first and second resistors.

3. A constant voltage output device as claimed in claim 1, wherein the first and second diodes are formed as diode-connected field-effect transistors.

4. A constant voltage output device as claimed in claim 1, wherein the first and second diodes have different current capacities.

5. A constant voltage output device comprising:

a field-effect transistor;

a first serial circuit composed of a first resistor, a second resistor, and a first diode connected in series between an output electrode of the field-effect transistor and a reference voltage point;

a second serial circuit composed of a third resistor and a second diode connected in series between the output electrode of the field-effect transistor and the reference voltage point;

a comparator whose first input terminal is connected to a node between the first resistor and the second resistor and whose second input terminal is connected to a node between the third resistor and the second diode;

a feed line for feeding an output of the comparator back to a gate of the field-effect transistor;

pre-driver means provided in the feed line for turning on the field-effect transistor when a power source voltage is lower than a predetermined voltage; and an output terminal connected to the output electrode of the field-effect transistor.

6. A metal-oxide semiconductor device including a constant voltage circuit, said constant voltage circuit comprising:

a field-effect transistor;

a first serial circuit composed of a first resistor, a second resistor, and a first diode connected in series between an output electrode of the field-effect transistor and a reference voltage point;

a second serial circuit composed of a third resistor and a second diode connected in series between the output electrode of the field-effect transistor and the reference voltage point;

a comparator whose first input terminal is connected to a node between the first resistor and the second resistor and whose second input terminal is connected to a node between the third resistor and the second diode;

feedback means for feeding an output of the comparator back to a gate of the field-effect transistor;

an output terminal connected to the output electrode of the field-effect transistor; and a starting circuit for supplying the first and second serial circuits with starting currents, said starting circuit is connected to the output electrode of the field-effect transistor, wherein $I_3<2\times I_1'$ where $I_3$ represents the starting current and $I_1'$ represents a value of current flowing through the first resistor in a steady state.

7. A metal-oxide semiconductor device, according to claim 6 wherein the first and second diodes have different current capacities.

8. A metal-oxide semiconductor device, according to claim 6 wherein an oscillation preventing capacitor made of a metal-oxide semiconductor is provided in the feedback means.

9. A metal-oxide semiconductor device including a constant voltage circuit, said constant voltage circuit comprising:

a field-effect transistor;

a first serial circuit composed of a first resistor, a second resistor, and a first diode connected in series between an output electrode of the field-effect transistor and a reference voltage point;

a second serial circuit composed of a third resistor and a second diode connected in series between the output electrode of the field-effect transistor and the reference voltage point;

a comparator whose first input terminal is connected to a node between the first resistor and the second resistor and whose second input terminal is connected to a node between the third resistor and the second diode;

a feed line for feeding an output of the comparator back to a gate of the field-effect transistor;

pre-driver means provided in the feed line for turning on the field-effect transistor when a power source voltage is lower than a predetermined voltage; and an output terminal connected to the output electrode of the field-effect transistor.

10. A metal-oxide semiconductor device, according to claim 9 wherein the first and second diodes have different current capacities.

11. A metal-oxide semiconductor device, according to claim 9 wherein an oscillation preventing capacitor made of a metal-oxide semiconductor is provided in the feed line.

* * * * *